June 21, 1960 — F. C. BAYER — 2,941,851
RADIAL AND THRUST BEARING
Filed Jan. 21, 1958 — 3 Sheets-Sheet 1

Inventor
Frank C. Bayer

June 21, 1960 F. C. BAYER 2,941,851
RADIAL AND THRUST BEARING
Filed Jan. 21, 1958 3 Sheets-Sheet 2

Inventor
Frank C. Bayer

June 21, 1960 F. C. BAYER 2,941,851
RADIAL AND THRUST BEARING
Filed Jan. 21, 1958 3 Sheets-Sheet 3

Inventor
Frank C. Bayer

United States Patent Office 2,941,851
Patented June 21, 1960

2,941,851

RADIAL AND THRUST BEARING

Frank C. Bayer, Lyndhurst, Ohio, assignor to Thompson Ramo Wooldridge Inc., a corporation of Ohio Filed Jan. 21, 1958, Ser. No. 710,357

10 Claims. (Cl. 308—122)

The present invention relates to improvements in radial and thrust bearings. More particularly, the invention relates to an improved bearing assembly wherein a rotating member is supported in a radial and axial direction with the utilization of a pressurized fluid which automatically accommodates for variances in loads and variances of direction of loads.

In providing support bearings for rotating members in certain environments and conditions, it is difficult to obtain a lubricant that will be operative. Such an environment occurs in high temperature applications. For example, in fuel pumps for certain jet engine supply requirements the bearing may operate at a temperature of 575° F. and normal lubricants will not operate under the high speeds and high temperature encountered. In the above circumstance, the present invention makes it possible to use fuel as a lubricant. In the arrangement provided, an improved bearing assembly is obtained for use in adverse circumstances, and also which obtains advantages useful in substantially any bearing use.

In a form of the invention, a rotating shaft is supported in a bearing and the shaft has an outer smooth cylindrical surface with an enlarged portion attached thereto providing spaced axial facing radial smooth shoulders which will coact with the bearing to maintain the axial position of the shaft and sustain the thrust on the shaft. The shaft is supported in a bearing having a first annular body and a second annular body, with each of the body sections having an internal generally cylindrical surface containing the smooth cylindrical surface of the shaft. The bearing bodies also are possessed of a generally radial end face adjoining the internal cylindrical surface with the end faces of the individual bodies in opposed facing spaced relationship so as to face the radial surfaces of the enlarged portion on the shaft. Between the internal generally cylindrical surface and the generally radial end face of the bearing body is an annular passage extending around the bearing body, and facing the juncture of the enlarged portion of the shaft and the cylindrical outer surface thereof. Means are provided for accommodating a supply of fluid under pressure to said annular passage. The internal surfaces of the bearing bodies are provided with a series of spaced angularly disposed recesses which face the surface of the shaft. The bearing bodies are also provided at their generally radial end faces with a plurality of angularly disposed separate recesses facing the shoulder or radial face of the enlarged portion of the shaft. Pressurized fluid is supplied to these recesses from the annular passages at the juncture of the internal surfaces and end faces by means of individual grooves formed in the internal surfaces and leading to the recesses in the internal surfaces, and formed in the end face and leading to the recesses in the end face. Fluid escape paths occur at the edges of the recesses due to spacing between the surfaces of the shaft and shaft shoulder, and the mating opposing surfaces of the bearing. The bearing bodies are carried in mounting means which define annular drain passages for receiving the fluid which escapes between the surfaces of the shaft and bearing.

It is an object of the present invention to provide an improved bearing for supporting a shaft in an axial direction and against thrust, utilizing a pressurized fluid which need not have good lubricating qualities.

Another object of the invention is to provide a shaft and bearing assembly which will be operative in adverse environments for normal lubricating fluids, such as in circumstances of very high temperatures.

Another object of the invention is to provide an improved shaft and bearing assembly wherein the shaft floats both axially and radially, and is pressure-balanced with apparatus which automatically accommodates for variances in thrust and load in axial or a radial direction.

A further object of the invention is to provide a bearing support for a shaft utilizing a fluid for a lubricant and for sustaining thrust wherein a wide range of lubricants af varying lubricating qualities may be used.

An important object of the invention is to provide an improved bearing assembly which has a negligible starting and low speed torque.

Another object of the invention is to provide a bearing assembly utilizing a pressurized fluid lubricant supplied to a thrust sustaining recess in the bearing with an arrangement provided so that if a recess becomes inoperative due to a break or an interruption of supply to the recess or wherein thrust surfaces become cocked or out of parallel due to manufacturing tolerance or a thermal distortion, the bearing will continue to operate satisfactorily.

Other objects and advantages will become more apparent with the teachings of the principles of the invention in connection with the disclosure of the preferred embodiments thereof, in the specification, claims and drawings, in which:

Figure 1:
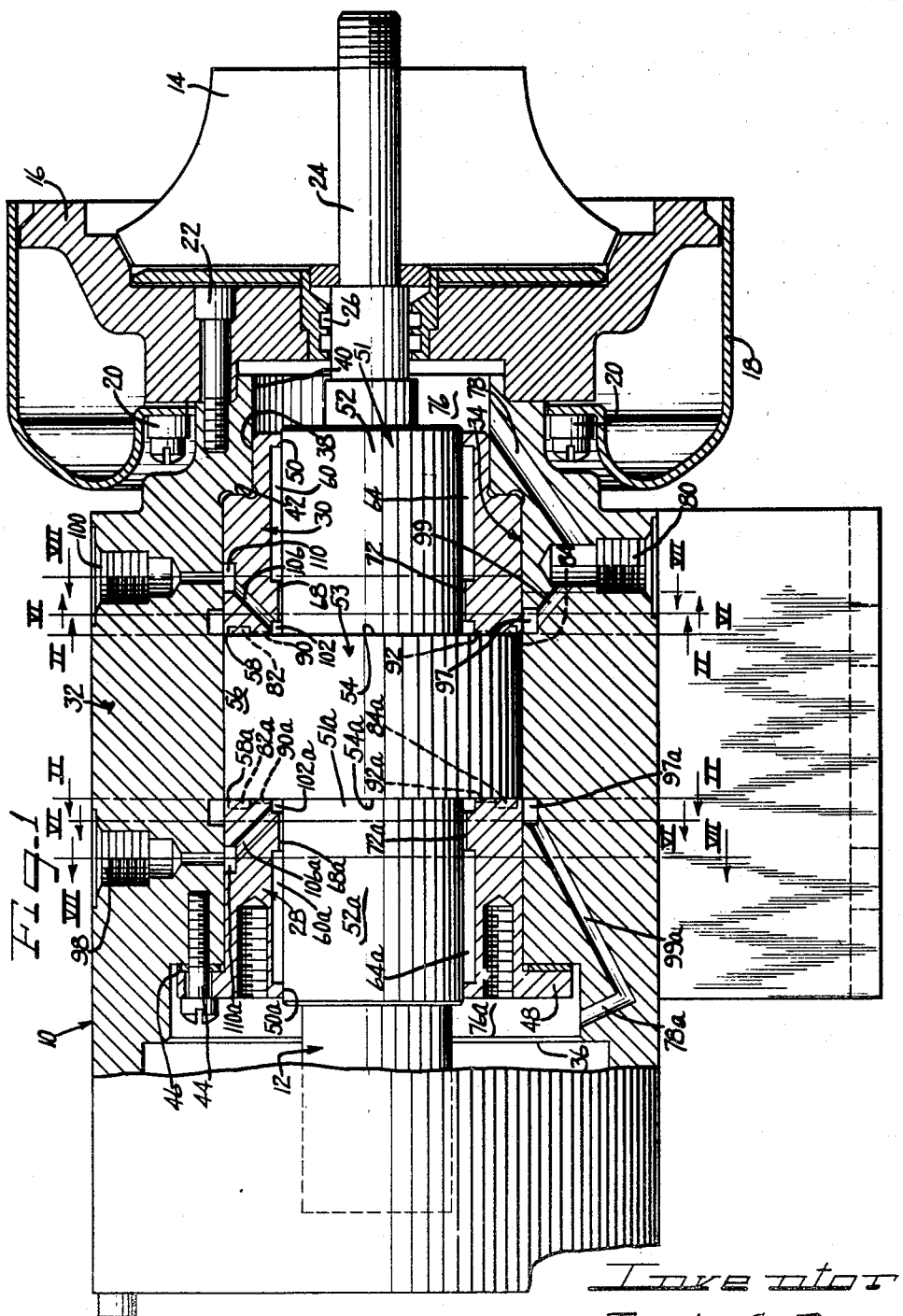
Figure 1 is an enlarged vertical sectional view taken through the axial center of the bearing assembly, and illustrating the shaft in place.

As illustrated in Figure 1, the bearing assembly 10 is operative to support a rotational shaft 12. The rotational shaft may operate for various purposes, and is illustrated as used for driving an impeller 14 of a pump which operates within a pump housing 16 which is partially shown. The pump housing 16 has an outer shell 18, which is attached by screws 20. The pump housing is assembled to the bearing 10 by bolts 22. The pump impeller 14 is carried on a reduced end 24 of the shaft, and a seal 26 is provided between the pump impeller 14 and the bearing assembly 10. The shaft 12 may be driven in any suitable manner, and the driving means are not illustrated.

The bearing assembly 10 includes a first annular bearing body section 28, and a second similar annular bearing body section 30. The body sections 28 and 30 are similar in shape and appearance in all respects from a functional standpoint and differ only in the manner in which they are held within a mounting means 32. The mounting means 32 is an annular shaped casting with a cylindrical bore 34 extending from one end and the bearing body sections 28 and 30 are assembled to the mounting means by being slid in from the end 36. The annular shaped bearing body section 30 is first slid in place and is provided with a reduced end 38, which enters a reduced portion 40 of the bore 34 through the mounting means. The reduced portion 38 provides a shoulder 42 which engages an annular shoulder at the end of the bore 34 to provide an axial stop for positioning the body section 30.

In assembly, the shaft 12 is next slid axially in place, as illustrated in Figure 1, and the annular shaped bearing body section 28 is next slid in place. This is held in position by a cap screw 44 which is threaded into a threaded opening provided in a surface 46 provided with an enlarged counterbore from the end 36 of the mounting means 32. The bearing section 28, for purposes of securing it in place, is provided with an annular flange 48.

As mentioned above, the bearing bodies 28 and 30 are similar in many respects, and differ substantially only in their means of being retained within the mounting means 32. Thus, it will be noted that various sections taken through the assembly 10 are the same for the different ends of the assembly, and one sectional view will suffice for both ends. In Figure 1, two section lines will be indicated for those sections which have the same construction and appearance, bearing the same section numbers, and the opposite parts will bear the same numbers, except that one part will have the suffix "a."

As illustrated in Figures 1 through 7, the bearing body 30 is annular in shape and has an internal cylindrical surface 50. Within this surface is journaled the shaft 12, and in particular, a portion 51 having a smooth outer cylindrical surface 52, which is of a dimension to fit rotatably within the bearing body surface 50.

The annular bearing body section 28 is provided with an inner cylindrical surface 50a within which is journaled the shaft 12, and in particular, a shaft length 51a having a smooth cylindrical surface 52a.

Between the shaft sections 51 and 51a is a central enlarged cylindrically shaped section 53. This enlarged section of the shaft has spaced radially extending shoulders 54 and 54a. The outer surface 56 of the central enlarged portion 53 has substantially the outer diameter of the bearing body sections 28 and 30, and fills the space between the bearing sections within the mounting means 32.

The bearing body 30 has a generally radial end face 58, which adjoins the internal cylindrical surface 50, and which faces the shoulder 54 of the shaft.

The bearing body section 28 similarly has a generally radial end face 58a which adjoins the cylindrical internal surface 50a, and which faces the shaft shoulder 58a, and thus is faced opposing to the radial end face 58 of the bearing body 30.

Thus, the shaft 12 is held and journaled in a radial direction within the cylindrically shaped internal surfaces 50 and 50a of the bearing bodies 30 and 28, and is held axially by the end faces 58 and 58a of the bearing bodies, and these faces generally face the shoulders 54 and 54a of the central enlarged section 53 of the shaft. The apparatus is constructed so that fluid pads or cushions will support the shaft in this position in a centrally located stance, and the shaft will be pressure-balanced, so as to retain this stance regardless of variances in amounts of axial or radial pressures or thrust on the shaft and regardless of changes of direction of forces or thrust.

Figure 3:
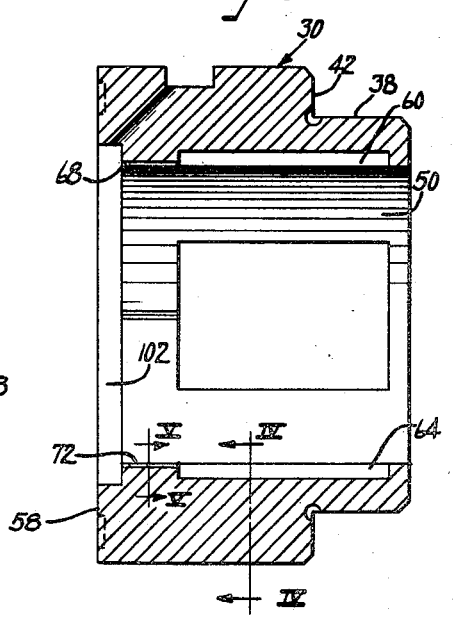
Figure 3 is a vertical sectional view taken along line III—III of Figure 2, through the bearing body.
Figure 4:
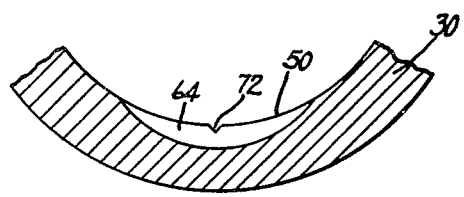
Figure 4 is an enlarged fragmentary sectional view taken along the line IV—IV of Figure 3.
Figure 5:
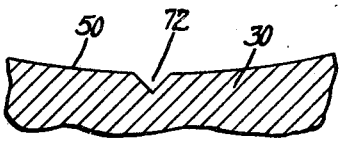
Figure 5 is a greatly enlarged fragmentary sectional view taken along line V—V of Figure 3.
Figure 7:
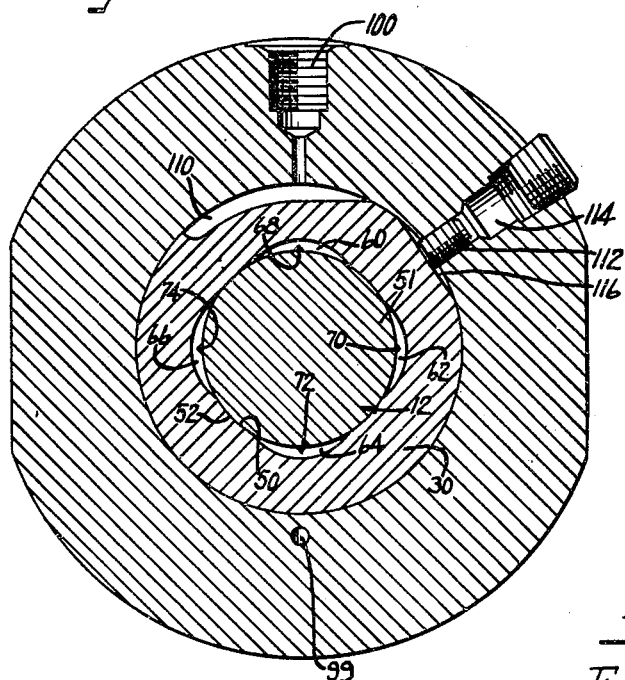

As may be best seen in Figures 3 and 7, the internal cylindrical surface 50 of the bearing 30 is provided with a plurality of recesses 60, 62, 64 and 66, which are angularly disposed around the inner surface 50 of the bearing body, and which provide fluid-containing recesses for radially sustaining or supporting the shaft section 51. Similar equally spaced angularly disposed recesses are provided in the bearing section 28, as shown in Figure 1, and recesses 60a and 64a are visible.

Pressurized fluid is delivered to the recesses through fluid flow passageways which are illustrated in the form of grooves 68, 70, 72 and 74, Figure 7. The fluid flows through these grooves to pressurize the recesses to form pressure pads of fluid for radially supporting the shaft in a central position with respect to the inner cylindrical surface 50 of the bearing body section 30.

Fluid leakage paths are present leading from each of the recesses by virtue of the small amount of clearance which is present between the outer cylindrical surface 52 of the shaft and the inner cylindrical surface 50 of the bearing body 30. These leakage paths will occur around the peripheral edge of the recesses, and the size of these paths will be determined by the position of the shaft.

That is, as illustrated in Figures 3 and 7, as the shaft moves downwardly with respect to the axial center of the bearing body 30, the leakage paths from the recess 60 will increase in size thereby causing a drop in fluid pressure within the recess 60. This will decrease the force which the pressure of the fluid applies against the surface of the shaft which is exposed to the recess, and the shaft will tend to move toward the recess. The opposite action will occur in the recess 64 which is opposite the recess 60. When the shaft moves downwardly closer to the lower recess 64, the size of the leakage paths from the recess or pocket 64, will decrease thereby causing an increase in fluid pressure within the recess 64. The increase in fluid pressure will cause an increased force in an axial direction between the surface of the shaft which is exposed to the recess and the fluid, and this will tend to move the shaft upwardly toward the recess 60, thus creating a balanced condition. The same action will occur with respect to the opposite two opposed recesses 62 and 66. Thus, in operation, the shaft will at all times tend to maintain itself in a centrally located floating position with respect to the recesses and with respect to the bearing body 30.

The same action occurs with respect to the other bearing body 28, wherein similar flow passageways are provided in the form of grooves, with the grooves 68a and 72a being shown in Figure 1.

A pressure drop will occur through these flow passageways dependent upon the rate at which the fluid leaks from the recesses through the leakage paths. Thus, the pressure drop through the leakage paths during normal operation is less than the pressure drop through the flow paths such as 68 and 68a, maintaining the pressure within the recesses at a pressure between the pressure of the supply fluid entering the paths 68 and 68a and the ambient external pressure to which the fluid leaks as it passes through the leakage paths between the surfaces of the shaft and the bearing body sections.

The leakage of fluid from the recesses 60, 62, 64 and 66 will generally be in an axial direction toward the end of the shaft section 51 to flow into the zone 76 at the end of the shaft section 51. This zone is at atmospheric pressure and the fluid will leak down through a conduit 78 to be drained off through a fitting 80, which leads to a supply reservoir for the fluid. At the other end of the bearing assembly, the fluid leaks from the bearing body section 28 out into the zone 76a, and into the conduit 78a to be drained back to the fluid reservoir through a fitting similar to 80, but which is not shown.

Figure 2:
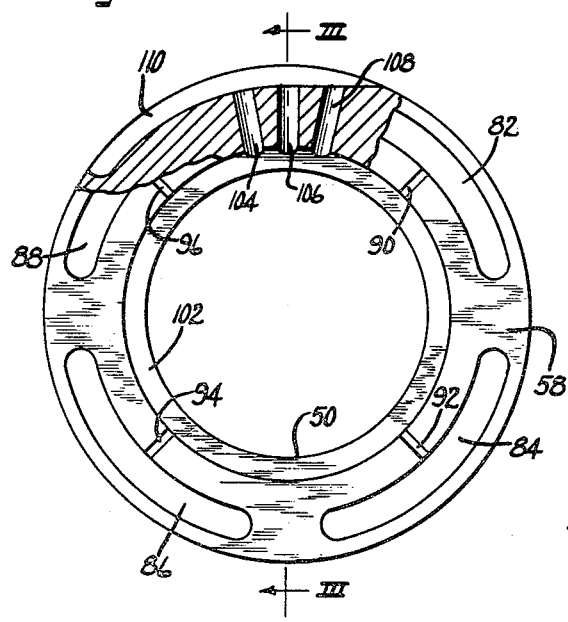
Figure 2 is a vertical sectional view of a bearing body taken along either of the lines II—II of Figure 1, with the mounting means removed.

As may be best illustrated in Figures 1, 2 and 3, the radial end face 58 is provided with a plurality of angularly disposed individual, separate, arcuate recesses 82, 84, 86 and 88. These recesses are filled with pressurized fluids to form pressure pads or recesses for providing axial supports for the shaft. The bearing body section 28 is provided with similar arcuate-shaped annularly disposed recesses, with recesses 82a and 84a being illustrated by the hidden broken lines. These are formed in the surface 58a, and face the shoulder 54a of the shaft.

Returning to Figures 2 and 3, pressurized fluid is supplied to the recesses 82, 84, 86 and 88, through passageways illustrated in the form of grooves, 90, 92, 94 and 96. The recesses 82a and 84a of the body section 28 are supplied with groove 90a supplying recess 82a, and with groove 92a supplying the recess 84a.

Figure 6:
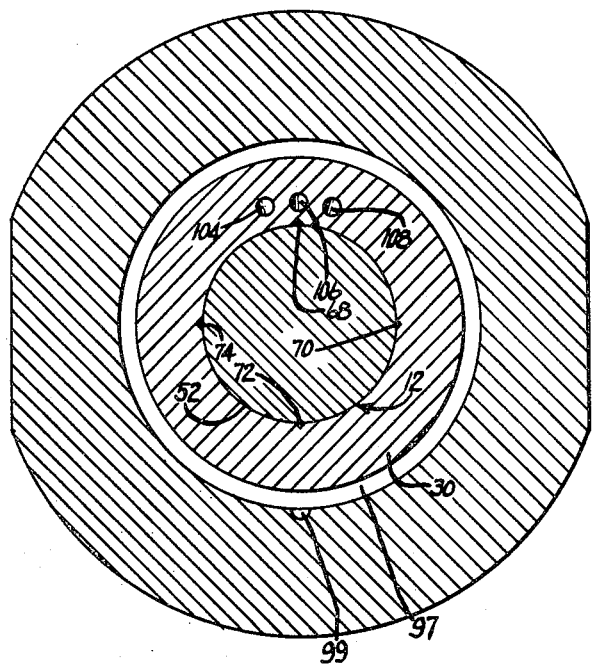
Figure 6 is a vertical sectional view taken through the assembly along either of the lines VI—VI of Figure 1; and, Figure 7 is a vertical sectional view taken along either of the lines VII—VII of Figure 1.

Flow leakage paths are formed at the edges of the recesses 82, 84, 86 and 88 and the size of the paths are dependent upon the space between face 58 and shoulder 54. The corresponding recesses 82a and 84a of the bearing body section 28 are dependent upon the spacing between the shoulders 54a and the face 58a. Leakage from the recesses in face 58 will generally be in a radial direction and the leakage fluid will flow into an annular channel 97 formed in the inner surface 34 of the mounting means 32. Leakage fluid from the recesses in the bearing face 58a flows into an annular channel 97a formed in the inner surface of the support means 32. The channels 97 and 97a drain to passageways 99 and 99a, respectively, which communicate with passageways 78 and 78a and are drained through the same fittings as these passageways. These structures are shown in Figures 1 and 6.

As the shaft 12 moves axially in one direction or the other due to change in loading, an increased space will occur between the surfaces on one side of the enlarged section 66 of the shaft, and a decreased space will occur on the other side. This will decrease the pressure in the recesses on the side where the spacing is increased, and increase the pressure on the side where the spacing has decreased. The increased pressure in the recesses increases the force of the fluid against the shaft in an axial direction and tends to return it to normal position. Thus, the shaft will receive floating support in an axial direction.

It will be seen that these radial or end recesses tend to sustain some of the unbalance forces in a radial direction, since any canting of the shaft will cause the pressure in the recesses at one side of the shaft to decrease, while the pressure on the other side increases. At the opposite side of the enlarged section, the action on the other shoulder will be exactly the opposite, thereby creating a righting couple to tend to maintain the shaft in its proper axial position. The recesses in the cylindrical surface of the bearing body sections 28 and 30 thus cooperate with the recesses in the radial faces.

In the mechanism illustrating the preferred embodiment, the recesses are preferably supplied with a common source of fluid at the same pressure. Fluid is delivered to the recesses through threaded openings 98 and 100, in the mounting means 32, which are adapted to receive fluid supply lines. Fluid is provided from a suitable pressure pump which may be operated from the shaft 12.

A common supply is provided for the recesses in the cylindrical surface, and the radial face of each of the bearing bodies 28 and 30 from a common supply source. This supply source is a fluid chamber illustrated in the form of an annular passage which is located at the juncture of the internal surface 50 of the bearing body 30, and the radial end face 58, with the annular passage shown at 102 in Figures 1, 2 and 3. A similar annular passage 102a is located at the juncture of the cylindrical internal surface 50a and the end radial face 58a of the bearing body 28. The annular passage 102 is in communication with each of the axial supply grooves 68, 70, 72 and 74, leading to the recesses in the cylindrical internal face of the bearing member, and with each of the radial supply passageways 90, 92, 94 and 96 leading to the recesses in the radial face 58 of the bearing member. Likewise, the annular passage 102a is in communication by means of the axial grooves with each of the recesses in the internal cylindrical face 50a of the bearing body member 28, and is also in communication through the radial grooves leading to each of the recesses in the radial face 58a.

Pressurized fluid is delivered to the annular passage 102, as illustrated in Figure 2, through a plurality of angled supply passageways 104, 106 and 108. These passageways lead from an unbalance-supply chamber 110. Another unbalance chamber 110a is provided in the bearing body 28 to receive pressurized fluid from the opening 98, and delivers fluid through a plurality of passageways to the annular passage 102a with one of the passageways 106a being shown.

Thus, fluid flows into the annular passages 102 and 102a, and is distributed axially and radially to the recesses in the inner cylindrical surfaces and the radial faces of the bearing body members 28 and 30. The bearing body members are held in place and prevented from rotating such as by a set screw 112 seated in an opening 114, Figure 7. The set screw engages a flat surface 116 on the bearing body member 30. A similar set screw may be provided for the bearing body member 28, or the cap screw 44 may be adequate to hold it in place and prevent it from rotating.

In operation, pressurized fluid is supplied to the openings 98 and 100 and flows downwardly to the chambers 110 and 110a, and through the plural passageways 104, 106 and 108 at one end of the bearing and through similar passages at the other end of the bearing. The fluid enters the common supply chamber which is in the form of the annular passage 102 for the bearing member 30, and the passage 102a for the bearing member 28. Pressurized fluid flows axially to the angularly spaced recesses 60, 62, 64 and 66 in the bearing body member 30. The shaft is thus supported by the pressure of the fluid in the recesses against the exposed portions of the surface 52 of the shaft. Pressurized fluid is similarly delivered through grooves in the bearing member 28 to the recesses formed in the internal cylindrical surface 50a thereof. Pressurized fluid is delivered from the common annular passage 102 to the recesses 82, 84, 86 and 88 in the radial surface 58 of the bearing member 30 through the axial grooves 90, 92, 94 and 96. Fluid is similarly delivered to the recesses in the radial face 58a of the bearing body 28 through the radial grooves communicating between the annular passage 102a and the recesses.

As the shaft rotates and axial and radial reaction forces occur to the shaft, it is supported in floating rotation in both a radial and axial direction by the fluid pressure in the recesses. Thrusts or forces in either a radial or axial direction, will increase the size of the escape paths which are formed around the edges of the recesses between the surfaces containing the recesses and the shaft surfaces to cause a leakage of fluid from the recesses and a reduction of pressure therein. Similarly, an increase in pressure will be caused in the opposing recesses as the shaft is forced closer to the bearing surface containing these recesses. This will cause the shaft to tend to be continually maintained in a pressure-balanced condition.

The fluid used may be a lubricating fluid or may be a fluid with poor lubricating properties, since the shaft is maintained in its floating position by the pressure of the fluid, rather than by the lubricating properties thereof. Thus, in an application, such as a high-temperature fuel pump, the fuel itself can be used for the shaft supporting fluid.

It will be recognized that there is a safety factor present in providing a plurality of thrust recesses in the radial faces of the bearing bodies. Whereas one recess would serve functionally to balance the shaft in an axial direction, if any of the recesses become inoperative, the remaining recesses will serve to continue to support the shaft axially. Thus, operation could continue if a break were to occur in the outer rim of any one of the recesses, or if any foreign materials should plug the lubricant feed groove leading to the recess. Further, the multiple thrust recesses will give the support to the shaft against cocking in a radial direction. Also, if the mating thrust surfaces become cocked or out of parallel due to manufacturing tolerance "stack-up," or thermal distortion, etc.

Thus, I have provided an improved bearing assembly which meets the objectives and advantages hereinbefore set forth. The bearing serves two important advantages which obtain negligible starting and low load torque, and the ability to function using fluids that have negligible lubricating qualities. In addition to serving the detailed objectives hereinbefore set forth, the bearing is relatively simple in construction, and is capable of extremely long operating life at high speeds and at adverse temperatures, being capable of use in environments where bearings of types heretofore used would be incapable of satisfactory operation.

I have, in the drawings and specification, presented a detailed disclosure of the preferred embodiments of my invention, and it is to be understood that I do not intend to limit the invention to the specific forms disclosed, but intend to cover all modifications, changes and alternative constructions and methods falling within the scope of the principles taught by my invention.

I claim as my invention:

1. A bearing comprising an annular body having an internal generally cylindrical surface and a generally radially end face adjoining said internal surface, said internal surface and said end face each having a series of recesses spaced angularly thereabout, means defining an annular passage at the juncture of said internal surface and said end face, means for accommodating a supply of fluid under pressure to said passage, and means defining grooves in said internal surface and end face leading from said passage to the respective recesses to accommodate pressurization of the respective recesses from said passage.

2. A bearing comprising an annular body having an internal generally cylindrical surface and a generally radial end face adjoining said internal surface, said internal surface and said end face each having a series of recesses spaced angularly thereabout, means defining an annular passage at the juncture of said internal surface and said end face, means for accommodating a supply of fluid under pressure to said passage, means defining grooves in said internal surface and end face leading from said passage to the respective recesses to accommodate pressurization of the respective recesses from said passage, mounting means to which said bearing body is fixed, means defining an annular drain passage in said mounting means radially outwardly of said recesses in said end face and communicating with said recesses in said end face by means of the clearance gaps between said end face and the surface of a journal in said bearing radially outwardly of the respective recesses, and means defining a drain chamber at the axial end of said internal surface remote from said end face and communicating with the respective recesses in said internal surface by means of the clearance gaps between said internal surface and the journal axially of the respective recesses.

3. A bearing and shaft assembly comprising a shaft, a bearing body having an internal surface defining an axial bore for receiving the shaft to be journaled therein and having an end face for opposing a shoulder connected with said shaft, means defining a series of angularly spaced recesses in said internal surface and in said end face, means for supplying fluid under pressure to said recesses, fluid drain means for receiving fluid from said recesses, first means defining fluid flow paths from said recesses to said drain means of cross section determined by the position of said shaft axially and radially with respect to said end face and said internal surface to tend to maintain said shaft equally spaced with respect to said recesses by changes in pressure in said recesses, and second means defining fluid supply flow paths communicating between said recesses and said fluid supply means and formed by a groove and a groove-closing surface between opposed sliding surfaces of the shaft and bearing body and having a cross-sectional area greater than said first means whereby the pressure drop through said first means will be less than said second means.

4. A bearing comprising a body having an internal generally cylindrical shaft supporting internal bearing surface, means defining a plurality of opposed recesses positioned in said internal surface, means defining an annular passage recessed into said internal surface and open to said surface to be closed by the shaft and being spaced from said recesses, means defining axial passageways from said annular passage to said recesses whereby said recesses receive fluid from a source of equal pressure, and means for supplying pressurized fluid to said annular passage whereby fluid is supplied to said recesses, said fluid escaping axially along said surface with dynamic axial variation in position of a shaft in said bearing whereby pressure differential between said recesses will tend to center said shaft.

5. A bearing comprising an annular body having an internal generally cylindrical surface and a generally radial end face adjoining said internal surface, means defining a plurality of separate pressure-balanced recesses in said radial end face providing cushion thrust recesses of fluid facing a radial shoulder of a shaft supported by the bearing, means defining an annular passage at the juncture of said internal surface and said end face, means for accommodating a supply of fluid under pressure to said passage, means defining individual pressure drop flow passageways communicating individually between said recesses and said annular passage, the area of said radial end face forming fluid escape paths when facing the radial shoulder of a shaft and determining the fluid pressure in said recesses whereby the thrust obtained for positioning the shaft axially will vary with shaft position, and means supporting the shaft axially in a direction opposing the support given by said radial bearing face.

6. A pressure-balanced shaft and bearing assembly comprising in combination an annular bearing body having an internal generally cylindrical surface and a generally radial end face adjoining said internal surface, a second annular bearing body having a similar internal generally cylindrical surface and a generally radial end face adjoining said internal surface and facing the radial end face of said first annular bearing body, said internal surfaces and said end faces each having a series of spaced individual recesses angularly disposed, a shaft located within said first and second annular bearing bodies and having a smooth cylindrical outer surface for mating sliding engagement with the internal cylindrical surfaces of the bearing bodies and having spaced generally radial shoulder surfaces facing in opposite directions and positioned in opposing facing relationship with the radial end faces of the annular bearing bodies, means in each of said annular bearing bodies defining separate annular passages at the juncture of said internal surfaces and said faces, means for accommodating a supply of fluid under pressure to said annular passages, means defining individual grooves in said internal surfaces and said end faces of said bearing bodies leading from one of the passages to the respective recesses to accommodate the flow of fluid and the pressurization of the recesses from said passages, means defining fluid escape paths between the radial end faces of the bearing bodies and the shoulders of the shaft whereby the pressure in said recesses will vary in accordance with the position of the shaft to tend to axially balance the shaft in axial location, and means defining fluid escape paths between the cylindrical surface of the shaft and the internal surface of the bearing bodies whereby the shaft will be supported and balanced in a radial direction for non-frictional floating pressure-balanced support.

7. A rotating shaft and bearing assembly comprising in combination a balanced rotatable shaft having a smooth outer surface, a bearing body member having an internal bearing surface facing said shaft surface, means defining a plurality of spaced recesses in one of said surfaces opening to face the other surface and forming a pressure recess chamber with said other surface and with fluid escape paths being formed at the edge of said recesses between said surfaces of a cross-sectional area dependent upon the relative position of said surfaces, a fluid supply chamber accommodating a supply of pressurized fluid, and individual pressure drop passageways leading between said supply chamber and said individual recesses to pressurize the recesses and formed by a groove and a facing surface formed between facing surfaces of said shaft and said bearing member.

8. A bearing and shaft assembly comprising a shaft element with a cylindrical surface and an adjoining radial surface, a bearing element having an arcuate radial bearing surface adapted for mating sliding thrust engagement with the radial surface on the shaft and having a general cylindrical internal bearing surface for containing the shaft, means defining pressure balanced recesses in the surfaces of at least one of said elements, and means defining individual pressurized fluid passageways opening into said recesses, said passageways formed by a groove in one of the surfaces and a facing surface, said passageways being of a size where pressure losses will occur with the loss of fluid from said recesses, said losses dependent on the relative position of said shaft element and said bearing element whereby fluid losses occur between the radial and cylindrical surfaces, the thrust provided by the pressurized fluid in said recesses being dependent on the pressure within said recesses to maintain the shaft in an axially pressure balanced location.

9. A bearing and shaft assembly comprising a shaft, a fluid maintaining bearing having an inner arcuate generally cylindrical bearing surface adapted for mating sliding engagement with a surface on the shaft, means defining a plurality of separate pressure balanced recesses in one of said surfaces for containing a thrust sustaining fluid, and means defining pressurized fluid passageways formed by a groove in one of said surfaces and a facing surface and opening into said recesses being of a size whereby pressure losses will occur with the loss of fluid from said recesses, said fluid loss occurring dependent on the relative position of said surfaces, the fluid in said recesses providing fluid bearing pads for the opposing surface and providing a bearing thrust dependent on the fluid pressure in said recesses.

10. A bearing comprising an annular body having an internal generally cylindrical surface and a generally radial end face adjoining said internal surface, said internal surface having a series of recesses spaced angularly thereabout, means defining an annular passage at the juncture of said internal surface and said end face, means for accommodating a supply of fluid under pressure to said passage, and means defining grooves in said internal surface leading from said passage to the respective recesses to accommodate pressurization of the respective recesses from said passage.

References Cited in the file of this patent

UNITED STATES PATENTS

| | | |
|---|---|---|
| 1,607,318 | Spillman | Nov. 16, 1926 |
| 1,906,715 | Penick | May 2, 1933 |
| 2,155,455 | Thoma | Apr. 25, 1939 |